Patented Apr. 7, 1942

2,278,826

UNITED STATES PATENT OFFICE 2,278,826

RECLAIMED RUBBER

Allen D. Castello, Cuyahoga Falls, and Henry L. Dixon, Akron, Ohio, assignors to The B. F. Goodrich Company, New York, N. Y., a corporation of New York No Drawing. Application September 28, 1939, Serial No. 296,974

18 Claims. (Cl. 260—712)

This invention relates to the reclaiming of vulcanized rubber and particularly to a method for preparing a non-staining reclaimed rubber.

There are many different methods for producing reclaimed rubber from scrap vulcanized rubber and the reclaimed rubber produced by known methods is satisfactory for many purposes. Practically all prior reclaimed rubbers, however, have the common property of staining other lighter colored objects and materials with which they come in contact. For many uses of reclaimed rubber such staining is quite harmful and, if not overcome, seriously limits the use of this valuable material. It is accordingly an object of this invention to produce a reclaimed rubber that will not stain or discolor other materials even when these materials are in contact with the reclaimed rubber for long periods of time, or even when they are permanently bonded to it. Similarly it may be stated that an object of this invention is to produce a reclaimed rubber in which the staining oils, resins, antioxidants, and the like that are found in the original vulcanized rubber stock are permanently fixed in the new reclaimed rubber and are therefore unable to transmigrate from the rubber onto any contacting object or material.

We have discovered a method of preparing a new and different reclaimed vulcanized rubber that is definitely non-staining which can be used safely under all conditions wherein a non-staining rubber product is desired. The reclaimed rubber of this invention is very similar in appearance and in physical properties to ordinary reclaimed rubber except that it has the important property of being non-staining toward objects ordinarily stained by prior reclaimed rubbers. It definitely opens up new areas of application for reclaimed rubber.

To prepare this superior reclaimed rubber I admix vulcanized rubber with an adsorbing agent and a water-insoluble soap either singly or in combination, and, preferably, together with a softening agent. This mixture is then subjected to any one of the usual reclaiming treatments such as heating in the presence of an acid or an alkali; or the reclaiming of the vulcanized rubber may be brought about by milling the mixture together in the presence of a softening agent, either with or without the application of heat. At the completion of the reclaiming operation, the water-insoluble soap, adsorbent, and the softening agent are homogeneously dispersed throughout the mass of reclaimed rubber. The reclaimed rubber is washed as soon as it leaves the reaction vessel and in this washing some of the adsorbent material, containing a portion of the oils, resins, and antioxidants of the prior vulcanized rubber, is removed. The adsorbent remaining in the rubber serves as a filler.

In certain applications of this invention, the insoluble soap may be dispensed with without seriously affecting the non-staining qualities of the resulting reclaimed rubber. In general, however, it may be stated that the presence of the soap valuably contributes to the production of a superior reclaimed rubber.

In this invention the adsorbing material serves a double purpose in that it assists in rendering the reclaimed rubber non-staining and also serves somewhat as a filler for the finished compounded rubber. Some of these adsorbent-fillers that can be successfully employed are clays such as fuller's earth; colloidal clays as bentonite and Wilkinite; and such activated carbons as bone char, wood charcoal, coconut charcoal, Kelpchar, Novit, Darco, soft coal coke, synthetic coke, carbon black, and the like. These materials may be used either singly or in combination and should be ground to a fine state of subdivisions before being incorporated with the ground scrap vulcanized rubber and other materials in the reaction vessel. The preferred adsorbent for this invention is ground wood charcoal as it is relatively inexpensive, and is an excellent adsorbent and filler.

The water-insoluble soap that is used in this invention may be added as such or it may be produced in the reaction simultaneously with the reclaiming of the vulcanized rubber by using a mixture of fatty acids together with a metallic compound such as zinc oxide, calcium oxide, magnesium carbonate, and the like. These water-insoluble soaps may be dispensed with, if it is so desired, for economical reasons although they do improve the non-staining qualities of the reclaimed rubber.

The softening agent preferred for use in this invention is heat-liquified rubber prepared by heating rubber, in any of its forms, such as caoutchouc, crude rubber, balata, gutta percha, or scrap vulcanized rubber, at atmospheric or higher pressure in an atmosphere of air, inert gases, or reducing gases with or without the presence of a reducing catalyst, until the residue remains liquid at room temperature. Other common softeners such as stearic acid, lauric acid, petrolatum, Nujol, pale mineral oil, synthetic rosin oil, and syncera wax will give excellent results when used as softeners in the process described. Liquified rubber is the preferred softener because it blends well with rubber, is itself non-staining, and is vulcanizable.

The following examples illustrate preferred embodiments of this invention.

*Example I.*—100 pounds of rubber tire scrap are ground and then mixed with 3⅓ pounds of calcium oxide, 7 pounds of fatty acids from cottonseed, 8 pounds of ground wood charcoal, 6 pounds of heat-liquified rubber, and 200 pounds of a 4½% aqueous caustic soda solution. This mixture is heated at 260° F. for 50 hours in a digester. At the end of this period the plastic mass is removed from the digester and washed on a rubber wash mill.

*Example II.*—100 pounds of ground rubber tire tread scrap are mixed with 4 pounds of zinc oxide, 7 pounds of fatty acids from cottonseed, 8 pounds of bone char, 6 pounds of petroleum and 200 pounds of 4½% aqueous caustic soda solution. This mixture is heated in an autoclave with steam at 365° F. for 18 hours. At the end of this period the reclaimed rubber is washed free from caustic solution on a rubber wash mill.

*Example III.*—100 pounds of ground grey rubber inner tube scrap are mixed with 12 pounds of fuller's earth, 6 pounds of pale mineral oil and 200 pounds of a 4½% aqueous caustic soda solution and heated in a digester at 380° F. for 16 hours. At the end of this time the plastic mass is removed and washed with water.

*Example IV.*—100 pounds of ground grey rubber inner tube scrap are mixed with 5 pounds of calcium oleate, 8 pounds of ground wood charcoal and 6 pounds of heat-liquified rubber. This mixture is milled together until the vulcanized rubber becomes plastic.

The rubber that is reclaimed in this invention may be any vulcanized rubber recovered from boots, shoes, tire treads, tire carcass, inner tubes, rubber hose, rubber clothing, and the like, and the rubber may contain substantial amounts of fibrous reinforcing material in those preferred cases wherein an aqueous alkaline solution is used as the reclaiming agent.

The amount of heat used in this invention and the period of time necessary to bring about complete reclaiming of the vulcanized rubber is a relative quantity. When low temperatures are employed these temperatures must be maintained for long periods of time, and, similarly, when high temperatures are used the reaction goes to completion in a shorter time. For example when the temperature is at a minimum of 260° F. the time of reaction is about 50 hours but when a temperature of 400° F. is used the reaction is complete in about 14 hours. For ordinary factory operations, the optimum temperature is 370° F. for about 18 hours. The heat may be supplied from any desired source but steam is preferred as the heating medium.

Having hereinabove described illustrative embodiments of our invention we wish to protect it broadly as limited only by the spirit and scope of the appended claims.

We claim:

1. The method of preparing a non-staining reclaimed rubber composition which comprises admixing vulcanized rubber, an adsorbent material, and a water-insoluble soap and thereafter subjecting the mixture to a reclaiming operation adapted to convert the rubber into a plastic material that is capable of being revulcanized.

2. The method of preparing a non-staining reclaimed rubber composition which comprises admixing vulcanized rubber, ground wood charcoal, and a water-insoluble soap and thereafter subjecting the mixture to a reclaiming operation adapted to convert the rubber into a plastic material that is capable of being revulcanized.

3. The method of preparing a non-staining reclaimed rubber composition which comprises admixing vulcanized rubber, ground wood charcoal, a fatty acid and a metallic compound adapted to react with the fatty acid to form a water-insoluble soap and thereafter subjecting the mixture to a reclaiming operation adapted to convert the rubber into a plastic material that is capable of being revulcanized.

4. The method of preparing a non-staining reclaimed rubber composition which comprises admixing vulcanized rubber and an adsorbent material and thereafter subjecting the mixture to a reclaiming operation adapted to convert the rubber into a plastic material that is capable of being revulcanized.

5. The method of preparing a non-staining reclaimed rubber composition which comprises admixing vulcanized rubber and ground wood charcoal, and thereafter subjecting the mixture to a reclaiming operation adapted to convert the rubber into a plastic material that is capable of being revulcanized.

6. The method of preparing a non-staining reclaimed rubber composition which comprises admixing vulcanized rubber and a water-insoluble soap, and thereafter subjecting the mixture to a reclaiming operation adapted to convert the rubber into a plastic material that is capable of being revulcanized.

7. The method of preparing a non-staining reclaimed rubber composition which comprises admixing vulcanized rubber, a fatty acid and a metallic compound, adapted to react with the fatty acid to form a water-insoluble soap, and thereafter subjecting the mixture to a reclaiming operation adapted to convert the rubber into a plastic material that is capable of being revulcanized.

8. A non-staining reclaimed rubber prepared by admixing vulcanized rubber, an adsorbent material, and a water-insoluble soap and subjecting the mixture to a reclaiming treatment adapted to convert the rubber into a plastic material that is capable of being revulcanized.

9. A non-staining reclaimed rubber prepared by admixing vulcanized rubber, ground wood charcoal, and a water-insoluble soap and subjecting the mixture to a reclaiming treatment adapted to convert the rubber into a plastic material that is capable of being revulcanized.

10. A non-staining reclaimed rubber prepared by admixing vulcanized rubber, ground wood charcoal, a fatty acid and a metallic compound adapted to react with the fatty acid to form a water-insoluble soap and subjecting the mixture to a reclaiming treatment adapted to convert the rubber into a plastic material that is capable of being revulcanized.

11. A non-staining reclaimed rubber prepared by admixing vulcanized rubber and an absorbent material and subjecting the mixture to a reclaiming treatment adapted to convert the rubber into a plastic material that is capable of being revulcanized.

12. A non-staining reclaimed rubber prepared by admixing vulcanized rubber and ground wood charcoal and subjecting the mixture to a reclaiming treatment adapted to convert the rubber into a plastic material that is capable of being revulcanized.

13. A non-staining reclaimed rubber prepared by admixing vulcanized rubber and a water-insoluble soap and subjecting the mixture to a reclaiming treatment adapted to convert the rubber into a plastic material that is capable of being revulcanized.

14. A non-staining reclaimed rubber prepared by admixing vulcanized rubber, a metallic compound adapted to react with a fatty acid to form a water-insoluble soap, and a fatty acid, and subjecting the mixture to a reclaiming treatment adapted to convert the rubber into a plastic material that is capable of being revulcanized.

15. The method of preparing a non-staining reclaimed rubber composition which comprises admixing vulcanized rubber, an adsorbent material, and a water-insoluble soap and thereafter reclaiming the rubber by heating the mixture in the presence of an alkali.

16. The method of preparing a non-staining reclaimed rubber composition which comprises admixing vulcanized rubber, an adsorbent material, and a water-insoluble soap and thereafter reclaiming the rubber by heating the mixture in the presence of an alkali for from 14 to 50 hours at a temperature of from 400° F. to 260° F.

17. The method of preparing a non-staining reclaimed rubber composition which comprises admixing vulcanized rubber, ground wood charcoal, and a water-insoluble soap and thereafter reclaiming the rubber by heating the mixture in the presence of an alkali.

18. The method of preparing a non-staining reclaimed rubber composition which comprises admixing vulcanized rubber, ground wood charcoal, and a water-insoluble soap and thereafter reclaiming the rubber by heating the mixture in the presence of an alkali for from 14 to 50 hours at a temperature of from 400° F. to 260° F.

ALLEN D. CASTELLO.
HENRY L. DIXON.

CERTIFICATE OF CORRECTION.

Patent No. 2,278,826. April 7, 1942.

ALLEN D. CASTELLO, ET AL.

It is hereby certified that error appears in the printed specification of the above numbered patent requiring correction as follows: Page 1, second column, line 19, for the words "clays as" read --clays such as--; page 2, first column, line 19, for "petroleum" read --petrolatum--; and second column, line 66, claim 11, for "absorbent" read --adsorbent--; and that the said Letters Patent should be read with this correction therein that the same may conform to the record of the case in the Patent Office.

Signed and sealed this 1st day of September, A. D. 1942.

(Seal)

Henry Van Arsdale,
Acting Commissioner of Patents.